United States Patent
Bottasso et al.

(10) Patent No.: US 11,760,468 B2
(45) Date of Patent: Sep. 19, 2023

(54) ROTOR FOR A HOVER-CAPABLE AIRCRAFT

(71) Applicant: LEONARDO S.P.A., Rome (IT)

(72) Inventors: Luigi Bottasso, Samarate (IT); Ermanno Fosco, Samarate (IT); Paolo Pisani, Samarate (IT); Francesco Vincenzo, Samarate (IT); Francesco Rosa, Samarate (IT); Francesco Braghin, Samarate (IT); Gabriele Cazzulani, Samarate (IT); Simone Cinquemani, Samarate (IT)

(73) Assignee: LEONARDO S.P.A., Rome (IT)

( * ) Notice: Subject to any disclaimer, the term of this patent is extended or adjusted under 35 U.S.C. 154(b) by 48 days.

(21) Appl. No.: 17/627,445

(22) PCT Filed: Jun. 25, 2020

(86) PCT No.: PCT/IB2020/056023
§ 371 (c)(1),
(2) Date: Jan. 14, 2022

(87) PCT Pub. No.: WO2021/014234
PCT Pub. Date: Jan. 28, 2021

(65) Prior Publication Data
US 2022/0250741 A1    Aug. 11, 2022

(30) Foreign Application Priority Data
Jul. 19, 2019   (EP) .................................... 19187399

(51) Int. Cl.
*B64C 27/00*  (2006.01)

(52) U.S. Cl.
CPC ...... *B64C 27/001* (2013.01); *B64C 2027/003* (2013.01); *B64C 2027/004* (2013.01); *B64C 2027/005* (2013.01)

(58) Field of Classification Search
CPC ............ B64C 27/001; B64C 2027/003; B64C 2027/005
See application file for complete search history.

(56) References Cited

U.S. PATENT DOCUMENTS

| | | | |
|---|---|---|---|
| 9,452,828 B2 | 9/2016 | Heverly et al. | |
| 2009/0236468 A1* | 9/2009 | Welsh | F16F 7/1011 244/17.11 |

(Continued)

FOREIGN PATENT DOCUMENTS

| | | |
|---|---|---|
| EP | 3 421 358 | 1/2019 |
| GB | 1120193 | 7/1968 |

(Continued)

*Primary Examiner* — Christopher D Hutchens
(74) *Attorney, Agent, or Firm* — Leason Ellis LLP

(57) ABSTRACT

A rotor for an aircraft is described that has a mast, an attenuating device to attenuate the transmission of vibrations from the mast in a plane orthogonal to the first axis; and a transmission device interposed between the mast and the attenuating device; the attenuating device comprises a first and a second mass unit with a first and a second mass rotatable about the first axis with a first and a second rotational speed, two control units operable to cause an additional rotation of at least one of the first and second masses; and a first and a second support assembly carrying the first and second masses; each control unit controls the angle between the first and second masses and each control unit comprises: a belt coupled to the support assembly and a drive unit coupled to the first belt, to cause the rotation of the first support assembly with respect to said transmission device.

15 Claims, 6 Drawing Sheets

(56) References Cited

U.S. PATENT DOCUMENTS

| | | | |
|---|---|---|---|
| 2010/0221110 A1* | 9/2010 | Jolly | B64C 27/001 |
| | | | 416/31 |
| 2011/0027081 A1* | 2/2011 | Jolly | F16F 15/223 |
| | | | 416/31 |
| 2011/0268573 A1* | 11/2011 | Girard | B64C 27/001 |
| | | | 416/145 |
| 2014/0360840 A1 | 12/2014 | Kirschbauer | |
| 2015/0203196 A1* | 7/2015 | Heverly, II | B64C 27/001 |
| | | | 701/3 |
| 2016/0264236 A1* | 9/2016 | Hocquette | B64C 27/001 |
| 2016/0325828 A1* | 11/2016 | Jolly | F16F 15/223 |
| 2020/0017203 A1* | 1/2020 | Stamps | B64C 27/001 |
| 2020/0191237 A1* | 6/2020 | Kopp | F16F 7/1011 |
| 2020/0255132 A1* | 8/2020 | Stamps | H02K 41/031 |

FOREIGN PATENT DOCUMENTS

| | | |
|---|---|---|
| WO | WO 96/06290 | 2/1996 |
| WO | WO 2015/031768 | 3/2015 |
| WO | WO 2017/209827 | 12/2017 |

\* cited by examiner

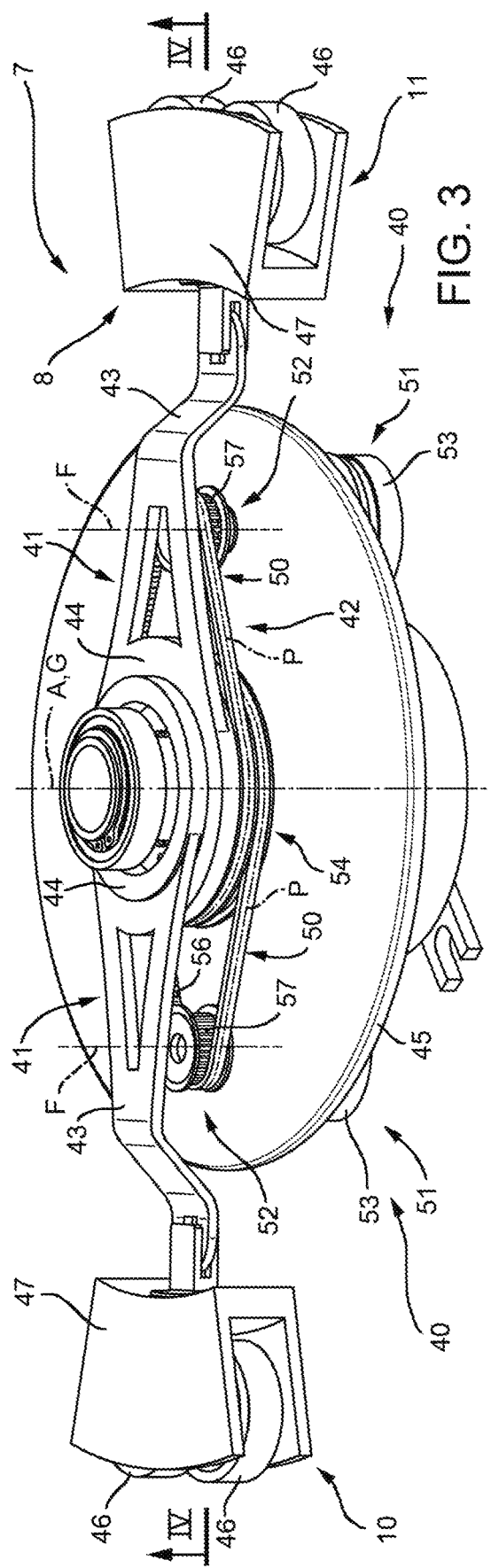
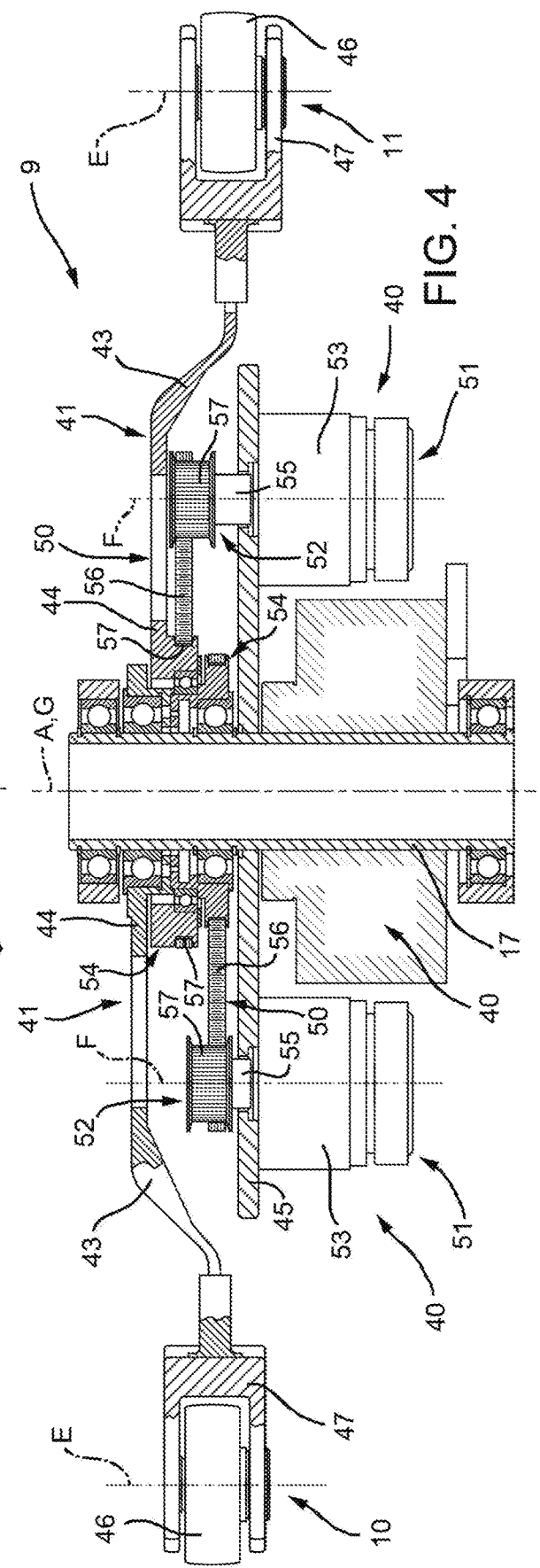

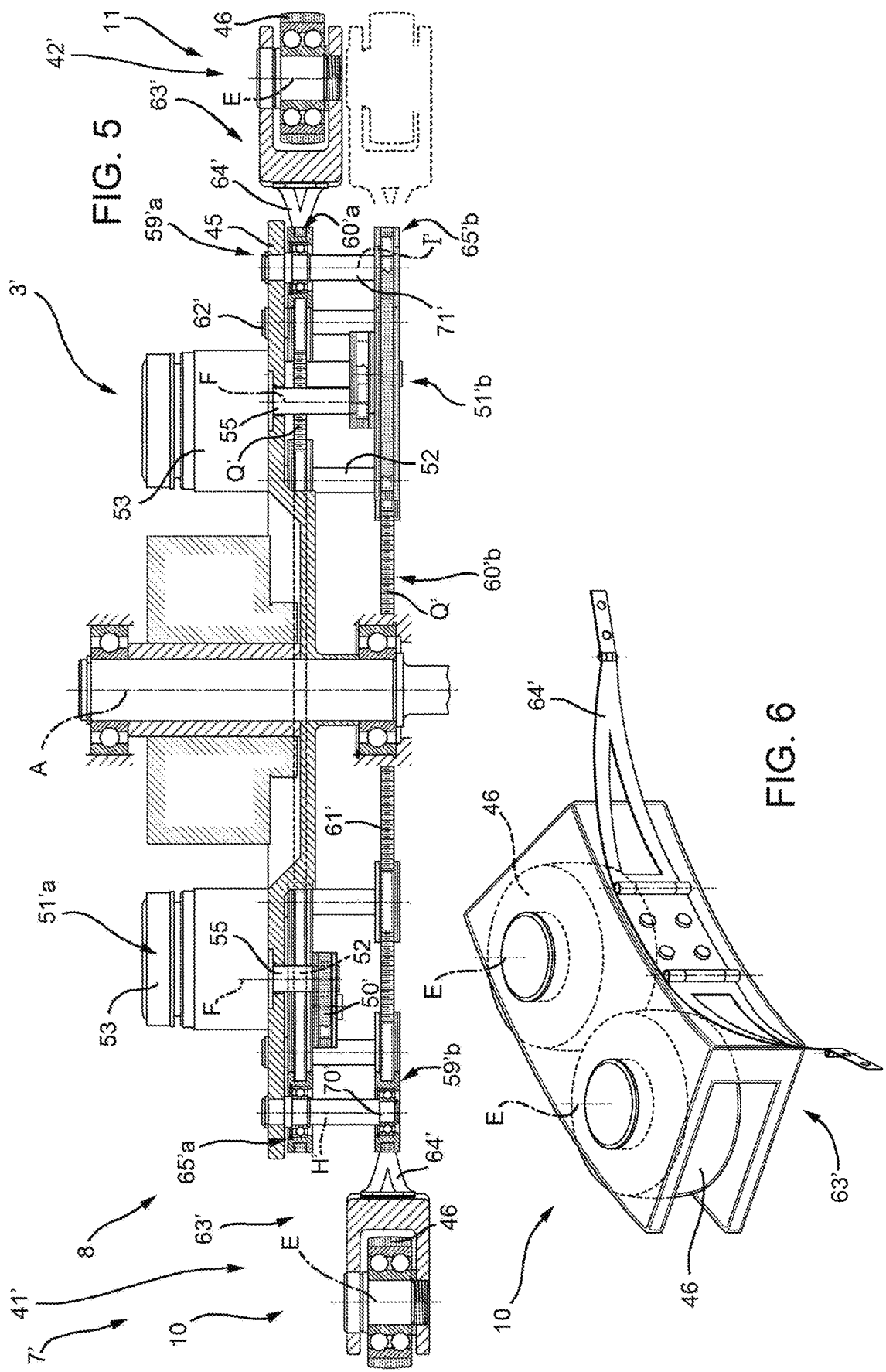

ROTOR FOR A HOVER-CAPABLE AIRCRAFT

CROSS-REFERENCE TO RELATED APPLICATIONS

This patent application is a U.S. National Phase Application under 35 U.S.C. § 371 of International Patent Application No. PCT/IB2020/056023, filed on Jun. 25, 2020, which claims priority from European patent application no. 19187399.1 filed on Jul. 19, 2019, all of which are incorporated by reference, as if expressly set forth in their respective entireties herein.

TECHNICAL FIELD

The present invention relates to a rotor for a hover-capable aircraft, in particular to a rotor for a helicopter.

BACKGROUND ART

Helicopters are known to basically comprise a fuselage, a main rotor positioned on the top of the fuselage and rotatable about its own axis, and a tail rotor located at the end of the fuselage.

In greater detail, the rotor, in turn, basically comprises a hub rotatable about the aforementioned axis and equipped with a plurality of blades radially fastened to and projecting from the aforesaid hub, and a mast connectable to a drive member and operatively connected to the hub to drive it in rotation.

In use, operation of the rotor causes the creation of high and low frequency vibrations. More specifically, low-frequency vibrations are generated by the wash separating from the blades and from the centre of the hub. This separation takes place at the centre of the hub and affects all the vertical and horizontal aerodynamic surfaces of the tail and the tail rotor.

In use, rotation of the blades at high angular speeds causes the generation of further high-frequency vibrations, which are transmitted to the mast and, in consequence, to the fuselage, deteriorating comfort for the occupants inside the fuselage.

More specifically, the vibratory loads act on both the hub and the mast, both axially and orthogonally to the mast's rotation axis.

Within the industry, it is known that in the rotating reference system, and thus integral with the rotor, in and mast, the vibratory loads acting in the plane of the rotor have angular frequencies equal to $(N+1)*\Omega$, $(N-1)*\Omega$ and multiples thereof, where $\Omega$ is the rotational speed of the mast and N represents the number of blades of the rotor. It is also known that in passing from the rotating system to the fixed system of the fuselage, the vibratory loads acting in the plane of the rotor undergo a shift in frequency and have an angular frequency equal to $N*\Omega$ and associated multiples thereof on the fixed system. In other words, the hub and the mast transfer the angular frequencies of the vibratory aerodynamic loads acting in the plane of the blades onto the aforesaid angular frequencies.

From the foregoing, there is a clearly felt need within the industry for limiting transmission from the mast to the fuselage of vibrations having the aforementioned angular frequency equal to the product of the mast's rotational speed and the rotor's number of blades.

For this purpose, there are known passive attenuating devices and active attenuating devices.

Passive attenuating devices basically comprise masses elastically suspended from the mast or the hub. The vibration of these suspended masses enables to at least partially dissipate the vibrations on the mast and the hub.

Although they are simple to build and install and do not require energy sources outside the rotor, passive attenuating devices have maximum limits regarding the performances they can offer.

Active attenuating devices are fundamentally actuators that exert an attenuating force on the hub or on the mast, which counters the transmission of vibrations to the fuselage.

An example of these active attenuating devices is shown in Patent Application EP-A-3421358, in the name of the applicant.

This patent application illustrates the use of an attenuating device to attenuate the transmission of flexural vibrations, i.e. in a plane orthogonal to the axis of the mast.

In greater detail, the attenuating device comprises:

a first and a second mass unit, each provided with a pair of masses eccentrically rotatable around the axis of the mast; and two control units, which are associated with respective mass units and are adapted to adjust the angle defined by the associated masses.

The masses are coupled to the rotation of the mast by a transmission device so that the masses of the first mass unit rotate eccentrically around the mast with a rotational speed of $(N-1)*\Omega$ and in the same direction of rotation as the mast, and the masses of the second mass unit rotate with a rotational speed of $(N+1)*\Omega$ and in the opposite direction of rotation to the mast.

In this way, the masses generate respective radial centrifugal forces with respect to the axis of the mast.

Referring the first mass unit, the components of the centrifugal forces in plane orthogonal to the axis of the mast vary sinusoidally with an angular frequency equal to $(N-1)*\Omega$.

Conversely, referring to the second mass unit, the components of the second centrifugal forces in the aforementioned plane vary sinusoidally with an angular frequency equal to $(N+1)*\Omega$.

The vector sum of the centrifugal forces generated by the masses of the first mass unit correspond to a first resultant attenuating force.

The vector sum of the centrifugal forces generated by the masses of the second mass unit correspond to a second resultant attenuating force.

Each control unit is selectively operable to adjust the angle between the respective masses of the respective first or second mass unit, so as to adjust the magnitude and phase with respect to a fixed direction of the respective first and second resultant attenuating forces.

For each mass of the associated first or second mass units, each control unit also comprises:

an electric motor; and a worm screw operatively coupled to the respective electric motor and rotatable about a respective axis; and a cogwheel coupled to the worm screw and operatively connected to the respective mass.

The operation of each electric motor causes, through the coupling between the associated worm screw and cogwheel, additional rotation of the masses of the associated first or second mass unit.

In this way, it is possible to adjust the magnitude and phase with respect to a fixed direction of the first and second resultants.

Due to the irreversibility of the meshing between each worm screw and the associated cogwheel, the attenuating devices of a known type are able to cause additional rotation of the masses in only one direction.

In consequence, the attenuating devices of a known type are susceptible to improvements with regard to flexibility and responsiveness in the generation of the first and second resultant attenuating forces, especially when the magnitude and direction of the vibrations to be attenuated change quickly.

Furthermore, the attenuating device described in the above-mentioned patent application EP-A-3421358 has significant axial bulk.

Therefore, there is awareness in the industry of the need to make the attenuation of vibrations transmitted to the fuselage as precise and rapid as possible.

There is also awareness in the industry of the need to attenuate flexural vibrations of the mast and the hub, preserving the effectiveness of the aforementioned active attenuating devices and, at the same time, limiting as far as possible the need for particularly complex dedicated parts, so as to reduce weight, bulk and overall costs.

GB 1120193, US 2014/360840, WO2015031768 and WO2015031768 describe attenuating devices of known type using the action of centrifugal forces of masses rotatable eccentrically with respect to the mast's rotation axis.

WO96/06290 discloses a vibration-compensating apparatus for counteracting harmonic vibrations from an excitation source comprises a first compensator unit with two rotary bodies rotating in opposite directions by the same rpm so as to generate a harmonically varying first force component in one direction. The apparatus comprises furthermore a second compensator unit with two rotary bodies rotating in opposite directions about axes parallel to the axes of the first compensator unit so as to generate a second harmonically varying force component in a direction parallel to the first harmonically varying force component. The rotary bodies of the first compensator unit and the rotary bodies of the second compensator unit are driven by separate infinitely variable driving motors. A control and synchronizing device controls the driving motors of the compensator units so that the rotary bodies rotate at an rpm which is a multiple of the frequency of the excitation source.

DISCLOSURE OF INVENTION

The object of the present invention is to produce a rotor for a hover-capable aircraft that enables satisfying at least one of the above-specified needs in a simple and inexpensive manner.

The aforesaid object is achieved by the present invention, in so far as it relates to a rotor for a hover-capable aircraft as defined in claim 1.

BRIEF DESCRIPTION OF THE DRAWINGS

For a better understanding of the present invention, three preferred embodiments are described hereinafter, purely by way of a non-limitative example and with reference to the accompanying drawings, in which:

FIG. 3 shows a perspective view of some details of the attenuating device of FIG. 2, with parts removed for the sake of clarity;

FIG. 4 is a section along line IV-IV of FIG. 3, with parts removed for the sake of clarity;

FIG. 5 is a cross-section of an actuating device incorporated in a rotor according to a second embodiment of the invention, with parts removed for the sake of clarity;

FIG. 6 shows a perspective view, on a highly enlarged scale, of a further detail of the attenuating device of FIG. 5, with parts removed for the sake of clarity;

BEST MODE FOR CARRYING OUT THE INVENTION

Figure 1:
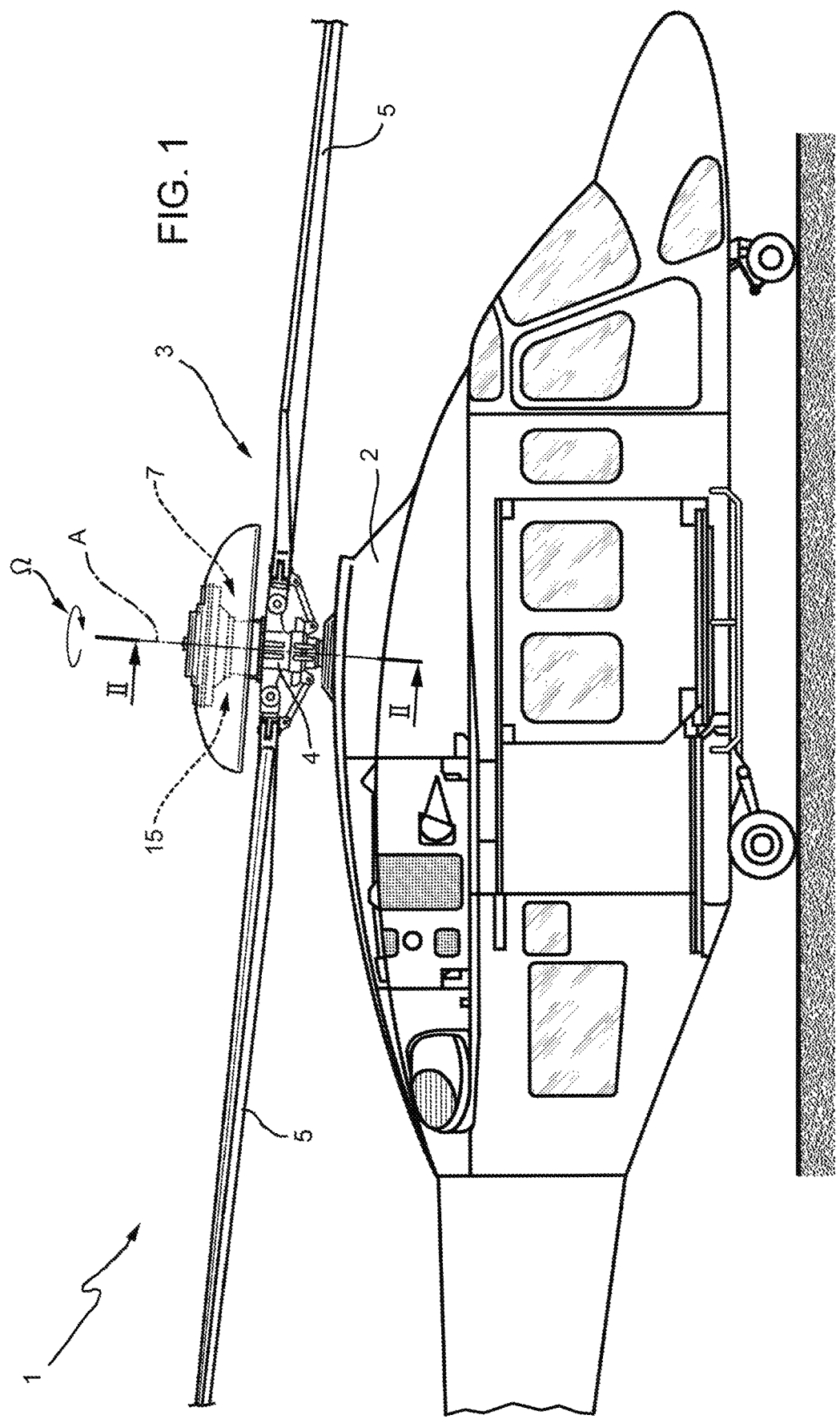
FIG. 1 is a side view of a helicopter comprising a rotor according to a first embodiment of the present invention, with parts removed for the sake of clarity.

Referring to FIG. 1, reference numeral 1 indicates a hover-capable aircraft, in particular a helicopter.

The helicopter 1, in turn, comprises:
a fuselage 2;
a main rotor 3 positioned on the top of the fuselage 2 and rotatable about an axis A; and
a tail rotor (not shown and in itself known) arranged at one end of the fuselage 2 and rotatable about its own axis, transversal to axis A.

In greater detail, the rotor 3 comprises a hollow hub 4 with axis A, carrying in a cantilever fashion a plurality of blades 5, which extend radially to axis A.

The rotor 3 also comprises a mast 150 (FIG. 2) rotatable about axis A with angular speed $\Omega$ with respect to a reference system integral with the fuselage 2. The mast 150 is coupled in an angularly integral manner to the hub 4 and is connected, in a manner not shown, to a drive unit, for example a turbine, of the helicopter 1. In particular, the hub 4 is driven in rotation about axis A by the mast 150.

In the case shown, the mast 150 is partly housed inside the hub 4.

Preferably, the mast 150 is hollow.

With particular reference to FIG. 1, the rotor 3 also comprises a flow conveyor 6 adapted to guide the airflow generated by the rotation of the rotor 3 according to a predetermined path shaped so as to limit the vibrations generated by separation of the aforesaid flow from the tips of the blades 5 arranged on the opposite end to the hub 4.

In particular, the flow conveyor 6 is annular, extends around axis A and is arranged on the opposite side of the hub 4 with respect to the fuselage 2.

Preferably, the flow conveyor 6 has a "cap-like" shape and is delimited by a pair of surfaces axially facing each other.

Preferably, the walls of the flow conveyor 6 are shaped so that their axial distance decreases proceeding in a radial direction starting from axis A.

The rotor 3 further comprises a vibration-attenuating device 7 configured to attenuate the transmission of vibrations to the mast, especially in a plane orthogonal to axis A. In other words, the attenuating device 7 is configured to attenuate the transmission of flexural vibrations of the mast 150 to the fuselage 2.

The attenuating device 7 comprises a mass unit 8 and a mass unit 9, which are rotatable about axis A with a first and a second angular speed, respectively. The mass units 8 and 9 are indirectly coupled to the mast 150.

Each mass unit 8 and 9 comprises a respective mass 10 and a respective mass 11 arranged eccentrically with respect to axis A and eccentrically rotatable about axis A.

The masses 10, 11 of mass unit 8 are coupled to the hub 4 and to the mast 150 so as to be rotatable about axis A with respect to the mast 150 in the same direction of rotation of the mast about axis A and with the first angular speed equal to $(N-1)*\Omega$ relative to the mast 150, where N is the number of blades 5 and $\Omega$ is the angular rotational speed of the mast 150.

In the present description, the term angular frequency means the frequency multiplied by $2\pi$.

In a similar manner, the masses 10, 11 of mass unit 9 are coupled to the hub 4 and to the mast 150 so as to be rotatable about axis A and with respect to the mast 150 in the opposite direction of rotation to the mast 150 about axis A and with the second angular speed equal to $(N+1)*\Omega$ relative to the mast 150.

Where not expressly indicated, hereinafter in the present description it is understood that the angular speeds $(N-1)*\Omega$ and $(N+1)*\Omega$ are to be considered in the reference system integral with the mast 150.

As a result of their rotation about axis A, the masses 10, 11 of each mass unit 8, 9 generate respective centrifugal forces directed radially to axis A and lying on a plane orthogonal to axis A.

Each of these centrifugal forces has respective components in the aforementioned plane orthogonal to axis A having a sinusoidal course with an angular frequency corresponding to the respective first and second angular speeds $(N-1)*\Omega$ and $(N+1)*\Omega$ of the respective masses 10, 11 about axis A.

The vector sum of the centrifugal forces generated by the masses 10, 11 of mass unit 8 correspond to a first resultant attenuating force. The components of this first resultant force in the plane orthogonal to axis A have a sinusoidal course with angular frequency $(N-1)*\Omega$.

The vector sum of the centrifugal forces generated by the masses 10, 11 of mass unit 9 correspond to a second resultant attenuating force. The aforementioned components of this second resultant force in the plane orthogonal to axis A have a sinusoidal course with angular frequency $(N+1)*\Omega$.

In this way, and considering the passage from the rotary system of the rotor 3 to the fixed system of the fuselage 2, the components of the first and second resultant attenuating forces are sinusoidal with angular frequency $N*\Omega$ with respect to the reference system integral with the fuselage 2.

In particular, these first and second resultant attenuating forces have magnitudes dependent on the weights of the respective masses 10, 11, on the angle defined by the masses 10, 11, and on the respective rotational speeds about axis A.

In fact, when, for example, the angle between the masses 10, 11 is minimal, the first (second) resultant attenuating force has maximum magnitude. Conversely, when this angle is one hundred and eighty degrees, the first (second) resultant attenuating force has zero magnitude.

In other words, by varying the relative angle between the masses 10, 11 of each mass unit 8 (9), it is possible to adjust the magnitude of the first (second) resultant attenuating force, and the phase angle defined between this first (second) resultant and a fixed direction in the plane orthogonal to axis A.

Hereinafter in this description, the term "angle between the masses 10, 11" means the angular distance between segments radial to axis A and joining axis A and the barycentres of the respective masses 10, 11.

In the case shown, the masses 10 and 11 of each mass unit 8 and 9 are equal to each other and are arranged at the same distance from axis A. In addition, the masses 10 and 11 of mass unit 8 are equal to the masses 10 and 11 of mass unit 9.

In consequence, the centrifugal forces generated by the masses 10, 11 of mass units 8 (9) are equal to one another in magnitude.

Figure 2:
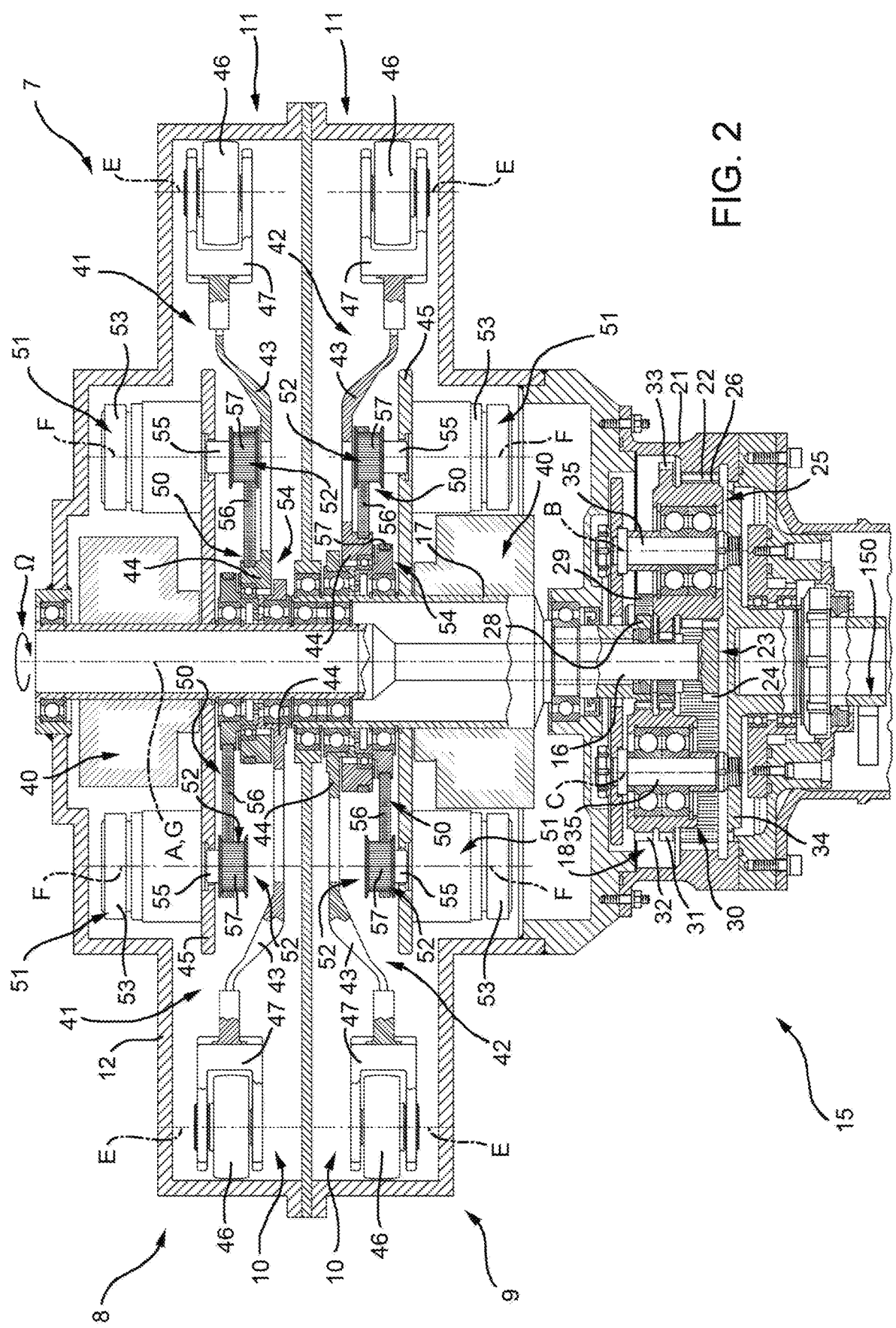
FIG. 2 is a section along line II-II of FIG. 1 of an actuating device incorporated in the rotor in FIG. 1, with parts removed for the sake of clarity.
Figure 7A:
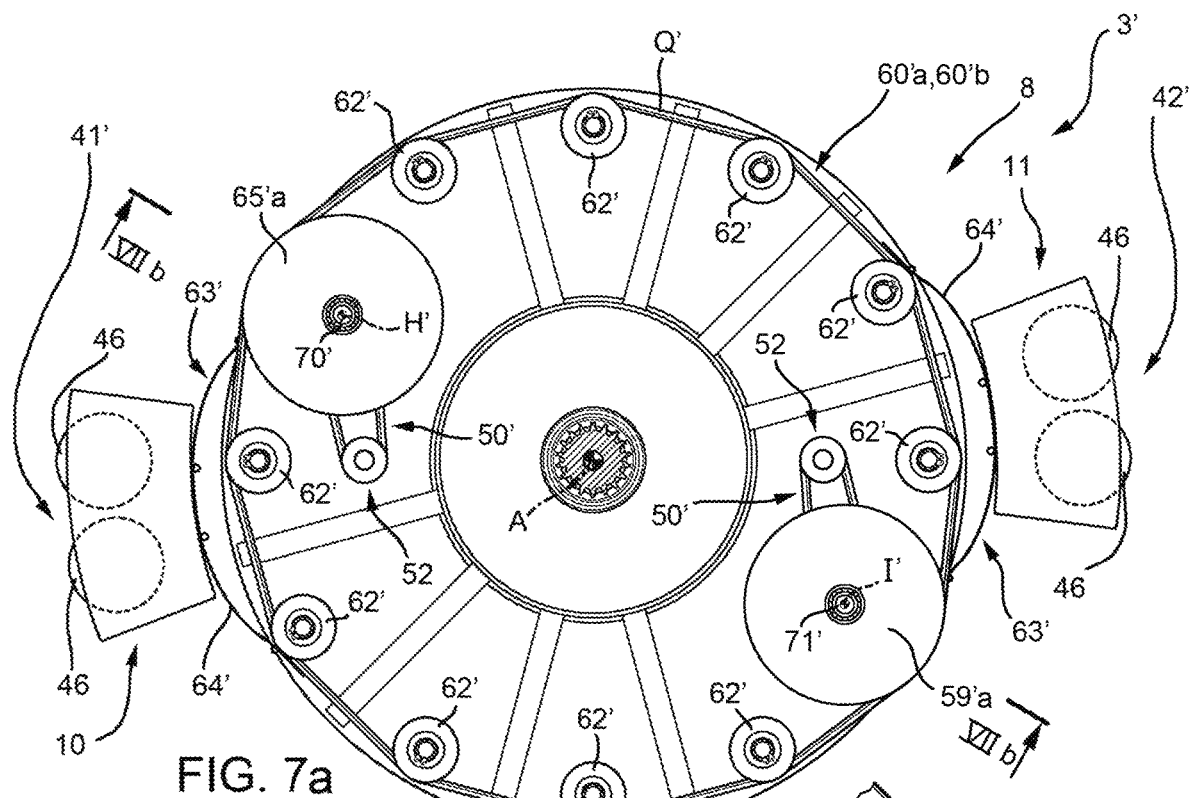
FIG. 7a is a plan view of the attenuating device of FIGS. 5 and 6, with parts removed for the sake of clarity.

With particular reference to FIG. 2, the rotor 3 also comprises a transmission unit 15 configured to transfer rotation of the mast 150 about axis A to the attenuating device 7. In particular, the transmission unit 15 is functionally interposed between the mast 150 and the mass units 8 and 9, and is configured to drive the respective masses 10 and 11 in eccentric rotation about axis A with angular speeds $(N-1)*\Omega$ and $(N+1)*\Omega$, respectively, with respect to the mast 150 and with respective directions of rotation opposite to each other.

In particular, the transmission unit 15 is functionally connected to the mast 150 and to the masses 10, 11 or mass units 8, 9.

Mass unit 8 is axially spaced from mass unit 9. In particular, mass unit 8 is positioned above mass unit 9, or rather mass unit 9 is interposed between mass unit 8 and the transmission unit 15 and/or the hub 4.

In particular, the attenuating device 7 comprises a shell 12 in which the mass units 8 and 9 and a part of the transmission unit 15 are housed.

Preferably, the shell 12 is interposed between the hub 4 and the flow conveyor 6. In particular, the flow conveyor 6 at least partially covers the shell 12.

In greater detail, the transmission unit 15 comprises FIG. 2):

an auxiliary shaft 16 operatively connected to mass unit 8, in particular to the respective masses 10 and 11, and rotatable about axis A;

an auxiliary shaft 17 operatively connected to mass unit 9, in particular to the respective masses 10 and 11, and rotatable about axis A; and a transformation unit 18 functionally coupled to the mast 150 and to the auxiliary shafts 16 and 17, and configured to receive motion from the mast 150 rotatable with angular speed $\Omega$ and transfer the motion to the auxiliary shafts 16 and 17.

In this way, auxiliary shaft 16 and auxiliary shaft 17 respectively rotate about axis A with rotational speed $(N-1)*\Omega$ in the same direction as the direction of rotation of the mast 150 and with rotational speed $(N+1)*\Omega$ in the opposite direction to the direction of rotation of the mast 150.

More specifically, tale transformation unit 18 comprises:

a first epicyclic train coupled to auxiliary shaft 16 and to the mast 150; and a second epicyclic train coupled to auxiliary shaft 17 and to the mast 150.

In greater detail, the second epicyclic train comprises, as will be described in greater detail further on, portions of the first epicyclic train. In this way, it is possible to obtain a transmission unit 15, in particular a compact transformation unit 18.

Preferably, and with particular reference to FIG. 2, the transformation unit 18 comprises:

a tubular casing 21 provided with gear teeth 22 radially internal with respect to axis A;

a sun gear 23, rotatable about axis A, having gear teeth 32 radially external with respect to axis A and angularly integral with auxiliary shaft 16; and a plurality of planet gears 25 (only one of which is shown in FIG. 2) rotatable about respective rotation axes B and each having respective first gear teeth 26 radially external with respect to the respective axis B.

In the case shown, the B-axes are parallel to and offset from axis A.

In particular, each first gear teeth 26 mesh with gear teeth 22 and with gear teeth 24.

The planet gears 25 are operatively and indirectly coupled to the mast 150 to be driven in rotation about axis A. Furthermore, the planet gears 25 rotate about respective axes B, due to the interaction between the respective gear teeth 26 and gear teeth 22. This rotation is then transferred to the auxiliary shaft 16 by the meshing between gear teeth 26 and gear teeth 24. In particular, the rotation of the auxiliary shaft 16 about axis A occurs in the same direction of rotation as that of the mast 150.

In particular, the first epicyclic train comprises the casing 21, the sun gear 23, the planet gears 25, the inner gear teeth 22, gear teeth 24 and gear teeth 26.

Preferably, and with particular reference to FIG. 2, the transformation unit 18 also comprises:

a sun gear 28 rotatable about axis A having gear teeth 29 radially external with respect to axis A and angularly integral with the auxiliary shaft 17; and a plurality of planet gears 30 (only one of which is shown in FIG. 2) rotatable about respective rotation axes C (parallel to axis A), and each having respective first gear teeth 31 and respective second gear teeth 32 radially external with respect to the respective axis C.

In particular, each planet gear 25 further comprises second gear teeth 33 radially external with respect to the respective axis B.

In particular, each first set of gear teeth 31 meshes with at least one respective second set of gear teeth 33, and each second set of gear teeth 32 meshes with gear teeth 29. Due to this configuration, each planet gear 30 is driven in rotation by the rotation of a respective planet gear 25, which, in turn, is rotatable with respect to the casing 21.

In the case shown, the C-axes are parallel to and offset from axis A.

In particular, the second epicyclic train comprises the casing 21, at least a portion of planet gears 25, planet gears 30 and sun gear 28, inner gear teeth 22 and gear teeth 26, 31, 32 and 33.

The gear teeth 22, 24, 26, 31, 32 and 33 are configured and/or coordinated with each other so as obtain a rotational speed of $(N+1)*\Omega$ for auxiliary shaft 17 and a rotational speed of $(N-1)*\Omega$ for auxiliary shaft 16.

The transformation unit 18 further comprises a planet-gear carrier to support the planet gears 25 and 30 in a rotatable manner about the respective axes B and C. In particular, the planet-gear carrier is rotatable about axis A and is angularly integral with the mast 150. In particular, due to the connection of the planet-gear carrier to the mast 150, rotation of the planet-gear carrier about axis A is obtained when the mast 150 rotates about axis A.

Preferably, the planet-gear carrier comprises a support base 34 orthogonal to axes A, B and C, and a plurality of rotating shafts 35 parallel to the respective axes B and C. The rotating shafts 35 are fixed to and project in a cantilever fashion from the support base 34.

Preferably, the support base 34 is operatively connected to the mast 150 so that it can be driven in rotation about axis A.

Preferably, the casing 21 is fixed to the shell 12.

The attenuating device 7 also comprises two control units 40, one operative connected to mass unit 8 and the other to mass unit 9.

More specifically, each control unit 40 can be operated to cause additional rotation about axis A of the masses 10, 11 of the respective mass unit 8, 9 relative to the corresponding auxiliary shaft 16, 17.

This rotation enables selective adjustment of the angle between the masses 10, 11 of the respective mass unit 8, 9 and the position of the masses 10, 11 with respect to the fixed direction rotating integrally with the respective auxiliary shafts 16, 17, simultaneously with the rotation of the mass units 8, 9 about axis A with the respective first and second angular speeds ($(N-1)*\Omega$ and $(N+1)*\Omega$).

In this way, each control unit 40 enables selective control of the magnitude and respective phase of the respective first or second resultant attenuating force generated by the associated mass unit 8, 9. It is thus possible to attenuate the vibrations originating from the blades 5 and transmitted from the mast 150 to the fuselage with the first and second resultant attenuating forces each having the desired magnitude and direction.

Each mass unit 8 and 9 comprises a respective support assembly carrying the respective mass 10 and a respective support assembly 42 carrying the respective mass 11 (FIGS. 2 and 3).

In greater detail, each support assembly 41, 42 is coupled to the transmission unit 15 so as to be driven in rotation about axis A with the respective first and second angular speeds $(N-1)*\Omega$ and $(N+1)*\Omega$.

More specifically, the support assemblies 41, 42 are connected in a rotatable manner about axis A with respect to the associated auxiliary shaft 16 and 17.

In particular, each support assembly 41, 42 is selectively operable by the respective control unit 40 to additionally rotate with respect to the respective auxiliary shafts 16, 17 and so selectively adjust the angle between the masses 10, 11 of the respective mass units 8, 9.

Each support assembly 41, 42 further comprises:

a respective annular support 44 coaxial with the respective auxiliary shaft 16 or 17 and axis A; and a respective arm 43 projecting in a cantilever fashion from the associated annular support 44, radially to axis A and supporting the associated mass 10, 11.

In particular, each annular support 44 is rotatable about axis A relative to the respective auxiliary shaft 16 or 17 and is coupled to the respective control unit 40 to enable the additional rotation of the masses 10, 11 with respect to the associated auxiliary shaft 16, 17 and the consequent adjustment of the angle between the respective masses 10 and 11.

Preferably, the annular support 44 of support assembly 41 is axial spaced from the annular support 44 of support assembly 42. In particular, the annular support 44 of support assembly 41 is arranged above the annular support 44 of support assembly 42.

Each mass unit 8 and 9 also comprises a respective base support rotatable about axis A and operatively connected to the transmission unit 15 to be driven in rotation about axis A with the first and second rotational speeds $(N-1)*\Omega$ and $(N+1)*\Omega$, respectively. In particular, the base support 45 of the mass unit 8 or 9 is angularly integral with the respective auxiliary shaft 16 and 17. In this way, each support assembly 41, 42 is driven in rotation by the respective auxiliary shaft 16, 17.

In this way, each support assembly 41, 42 is free to additionally rotate relative to the respective auxiliary shaft 16, 17 under the action of the corresponding control unit 40.

In particular, each support assembly 41 and 42 is arranged axially on a first axial side of the respective base support 45. In the case shown, the support assemblies 41, 42 are arranged above the base support 45.

Preferably, each base support 45 is made in the form of a circular plate.

Each mass 10, 11 comprises a pair of wheels 46 rotatable about respective axes E.

In the case shown, the E-axes are offset from and parallel to axis A and are arranged at the same radial distance from axis A.

Preferably, each mass 10 and 11 is coupled to the respective arm 43 in a radially movable manner so as to be pushed against an inner wall of the shell 12 by the associated centrifugal force.

Due to this contact and to the rotation of the masses 10 and 11 about ax each wheel 46 rotates about the respective axis E.

Furthermore, due to this contact between the wheels 46 and the inner wall of the shell 12, the respective centrifugal forces are transmitted to the mast 150 in an efficient manner, due to the support system of the mast 150 with respect to the shell 12.

The masses 10, 11 of each mass unit 8 and 9 lie on the same plane orthogonal to axis A. In this way, the sizes of the wheels 46 define a minimum angle between the respective masses 10 and 11, at which the masses 10 and 11 are in contact with each other.

Each mass 10, 11 also comprises a coupling element 47 carrying the respective wheels 46 and coupled to the respective arm 43.

Preferably each coupling element 47 is connected to the respective arm 43 in a radially movable manner so as to make the respective wheels 46 radially movable, under the action of the associated centrifugal forces.

Alternatively, or in addition, each wheel 46 could be connected to the respective coupling element 47 in a radially movable manner.

Advantageously and with particular reference to FIGS. 2 to 4, each control unit 40 comprises:

a belt 50, in particular an endless belt, operatively coupled to the respective support assembly 41 or 42 and movable along a first closed path P; and a drive unit 51, operatively coupled to the respective belt 50 and operable to cause rotation of the respective belt 50 along the respective path P and consequent rotation of the respective support assembly 41, 42 and the respective mass 10, 11 about axis A.

In greater detail each belt 50 is made of a polymer material, in particular an elastomeric material, such as, for example, rubber.

Each drive unit 51, in turn, comprises:

an actuator 53, in particular an electric motor;
a drive pulley 52 rotatable about a respective rotation F and driven in rotation by the actuator 53 about the associated axis F; and
a driven pulley 54 rotatable about a respective axis G, and operatively connected to the respective support assembly 41, 42 and to the drive pulley 52 by the associated belt 50.

In the case shown, the F-axes are offset from and parallel to axis A.

In particular, each belt 50 is connected to the respective drive pulley 52 and the respective driven pulley 54 to define a belt transmission. In other words, each belt 50 advances along at least a portion of the respective path P as a function of the rotation of the respective drive pulley 52 about the respective rotation axis F and causes rotation of the respective driven pulley 54 about the respective rotation axis G.

Each actuator 53 is also configured to cause rotation the respective drive pulley 52 about the respective rotation axis F and the consequent rotation of the respective driven pulley 54 and the respective support assembly 41, 42 connected to the respective driven pulley 54.

Preferably, each actuator 53 is operable to selectively cause rotation of the respective drive pulley 52 in the clockwise direction or a anti-clockwise direction.

In this way, it is possible to rotate the respective mass 10 or 11 in the clockwise direction or anti-clockwise direction and change the angle defined between the respective masses 10, 11.

In particular, each actuator 53 comprises an output shaft 55 coaxially connected to the respective drive pulley 52 and rotatable about the associated axis F.

Each belt 50 also comprises respective toothing 56. In particular, the respective toothing 56 is arranged along a radially inner surface of the belt 50.

In particular, each drive pulley 52 and each driven pulley 54 comprise respective coupling gear teeth 57. The toothing 56 of the belt 50 meshes with the respective coupling gear teeth 57 of the respective drive pulley 52 and of the respective driven pulley 54.

Preferably, each set of coupling gear teeth 57 is arranged radially external to the respective rotation axis F or G.

In the case shown, the axis G of each driven pulley 54 is coincident with axis A.

Preferably, each driven pulley 54 is integral with the annular support 44 of the respective support assembly 41, 42.

Each drive unit 51 is fixed to the respective base support 45. In particular, each actuator 53 is axially arranged at the second side of the respective base support 45, opposite to the respective first side.

Conversely, the drive pulley 52 and driven pulley 54 are axially arranged on the respective first side.

Preferably, the masses 10, 11 are axially interposed along axis A between the actuators 53 of mass unit 8 and the actuators 53 of mass unit 9.

Furthermore, the actuators 53 of mass units 8, 9 are radial interposed between the masses 10, 11 of mass units 8, 9.

In this way, it is possible to reduce the axial and radial dimensions of the shell 12.

The rotor 3 also comprises a first slip-ring and a second slip-ring (not shown) to electrically connect a source of electrical power carried on the fuselage 2 with respective actuators 53.

Figure 9:
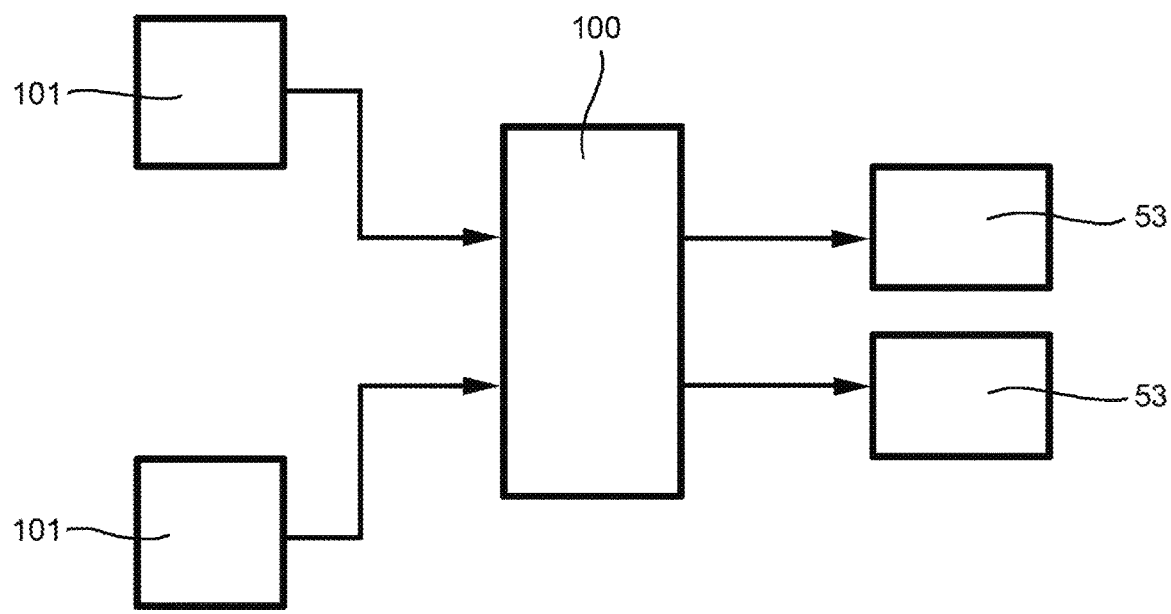
FIG. 9 shows a schematic view of some components of the device of FIGS. 2 to 8.

The rotor 3 also comprises (FIG. 9):

a plurality of sensors 100 configured to generate a plurality of signals associated with the state of acceleration of the fuselage 2 in a plane orthogonal to axis A; and a control unit 101 configured to generate, on the basis of the signals generated by the aforesaid sensors, a control signal for the actuators 53 of the control units 40.

In use, the mast 150 drives the hub and the blades 5 in rotation about axis A.

More specifically, the mast 150 rotates about axis A with angular speed $\Omega$, with reference to the reference system integral with the fuselage 2.

The rotation of the hub 4 and of the blades 5 generates vibrations, which would tend to be transmitted to the mast 150 and, from there, to the fuselage 2.

With respect to the fixed system of the fuselage 2, these vibrations mainly have an angular frequency equal to $N*\Omega$, where N is the number of blades 5 and $\Omega$ is the angular rotational speed of the mast 150.

In order to reduce these vibrations, the mast 150 drives, via the transmission unit 15, the masses 10 and 11 of the mass units 8 and 9, in rotation about axis A with the respective first and second angular speeds $(N-1)*\Omega$ and $(N+1)*\Omega$ and with respective directions in the same and in the opposite direction with respect to the direction of rotation of the mast 150.

These rotations of the masses 10 and 11 of the mass units 8 and 9 generate respective centrifugal forces.

The resultant of the centrifugal forces of the masses 10, 11 of mass unit 8 (9) is equal to the first (second) resultant attenuating force.

More specifically, the components of the first and second resultant attenuating force in the plane orthogonal to axis A are sinusoidal and with respective angular frequencies equal to $(N-1)*\Omega$ and $(N+1)*\Omega$, in the reference system integral with the mast 150.

These first and second resultant attenuating forces counter the loads due to vibrations in the plane orthogonal to axis A.

Furthermore, these components of the first and second resultant attenuating forces have, in the reference system integral with the fuselage 2, an angular frequency equal to $N*\Omega$, i.e. to the angular frequency of the disturbing vibratory forces that it is wished to attenuate.

The resultant first (second) attenuating force has magnitude and phase dependent on the respective angles between the respective masses 10 and 11 of the respective mass unit 8(9). For example, the magnitude of these first and second resultant forces is maximum when the angle defined between the associated masses 10 and 11 is minimum. Conversely, this magnitude is minimum when the angle between the associated masses 10 and 11 is one hundred and eighty degrees.

It is important to note that the masses 10, 11 exert the respective first and second resultant attenuating forces on the mast 150 and rotate with respective angular speeds $(N-1)*\Omega$ and $(N+1)*\Omega$, both when the actuators 53 are activated and when the actuators 53 are deactivated.

Whereas the selective activation of the control units 40, in particular of actuators 53, enables varying the magnitude and phase of the first and second resultant forces on the mast 150.

The functioning of the rotor 3 is hereinafter described starting from a state in which the control units 40, in particular the actuators 53, are deactivated. In this condition, the corresponding angles between the respective masses 10 and 11 are fixed.

The mast 150 drives the auxiliary shafts 16 and 17 of the transmission unit 15 in rotation about axis A.

The first and second epicyclic trains cause the rotation of the auxiliary shafts 16 and 17 about axis A with the respective first and second angular speeds $(N-1)*\Omega$ and $(N+1)*\Omega$, in the reference system integral with the mast 150.

In particular, the mast 150 and auxiliary shaft 16 rotate in the same direction and auxiliary shaft 17 rotates in the opposite direction to the mast and auxiliary shaft 16.

The auxiliary shafts 16 and 17 respectively drive the masses 10, 11 of the respective mass units 8 and 9 in rotation about axis A with the respective angular speeds $(N-1)*\Omega$ and $(N+1)*\Omega$.

In addition, during rotation about axis A, the masses 10, 11 are pushed by centrifugal forces against the inner wall of the shell 12.

In the condition where the control units 40 are deactivated, the actuators 53 are deactivated and so the angle between the respective support assemblies 41 and 42 and the masses 10 and 11 of the respective mass units 8 and 9 does not change.

In consequence, in the aforementioned condition, the support assemblies 41 and 42, although mounted in an angularly movable manner with respect to the respective auxiliary shaft 16 and 17, are rigidly driven in rotation by the respective auxiliary shaft 16 and 17 with the respective angular speeds $(N-1)*\Omega$ and $(N+1)*\Omega$.

Thus, rotation of the support assemblies 41 and 42 causes the eccentric rotation of the associated masses 10 and 11 about axis with the respective angular speeds $(N-1)*\Omega$ and $(N+1)*\Omega$.

The functioning of the rotor 3 is hereinafter described with reference to a state of activation of the control units 40, in particular of actuators 53.

The control unit 100 receives signals associated with the state of acceleration of the mast 150 from the sensors 101 and generates control signals for the actuators 53 of the control units 40, in the event of detecting the need to vary the phases and magnitudes of the first and second resultant attenuating forces.

The activation of one or more actuators 53 causes rotation of the respective support assemblies 41 and 42 about axis A to position the masses 10 and 11 at the desired relative angular positions.

More specifically, the operation of each actuator 53 causes the rotation of the associated drive pulley 52 by a given angle about the associated axis F. In consequence, the associated belt 50 advances by a given amount along the path P.

The associated driven pulley 54 also rotates by a given angle about axis A, G causing the additional rotation of the associated support assembly 41, 42 and the associated masses 10, 11 by a given angle about axis A with respect to the auxiliary shafts 16, 17.

With particular reference to FIGS. 5, 6, 7a and 7b, reference numeral 7' indicates an attenuating device (only partially shown) according to a second embodiment of the present invention.

Attenuating device 7' is similar to attenuating device 7 and will hereinafter be described only with regard to what differentiates it from the latter; the same or equivalent parts of attenuating devices 7 and 7' will be indicated, where possible, by the same reference numbers.

In particular, each drive unit 51'a, 51'b differs from drive unit 51 in that it comprises:
- an associated support belt 60'a, 60'b carrying the respective mass 10, 11 and movable along a respective closed path Q';
- an associated coupling pulley 59'a, 59'b angularly integral with the respective driven pulley 54'a, 54'b and around which the support belt 60'a, 60'b is wound; and
- a return pulley 65'a, 65'b around which the support belt 60'a, 60'b is wound.

In particular, the driven pulleys 54'a, 54'b are rotatable about respective axes H' and I' with respect to the base support 45. In the case shown, the axes H' and I' are radially external to axis A and angularly spaced by one hundred and eighty degrees with respect to axis A.

Figure 7B:
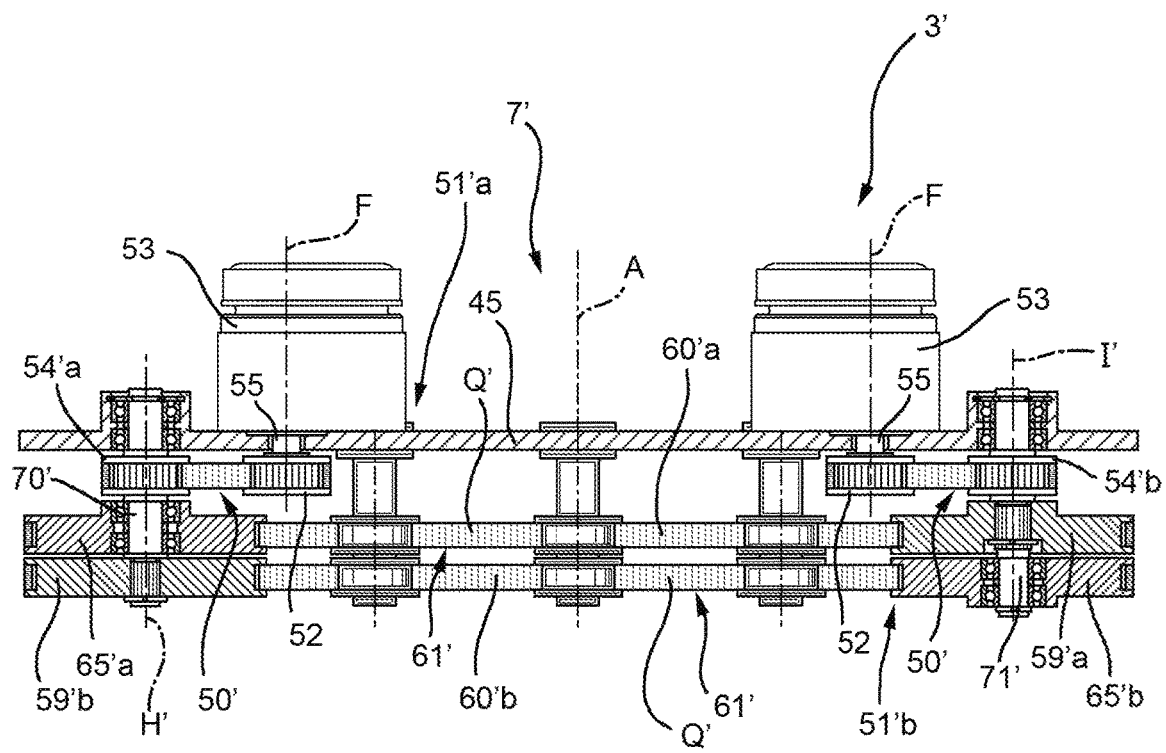
FIG. 7b is a schematic section along line VIIb-VIIb of FIG. 7a, with parts removed for the sake of clarity.

Referring to drive unit 51'a, the coupling pulley 59'a is rotatable about axis I' and the return pulley 65'a is rotatable about axis H' (FIG. 7b).

Referring to drive unit 51'b, the coupling pulley 59'b is rotatable about axis H' and the return pulley 65'b is rotatable about axis I'.

Each control unit 40' also comprises a pair of pins 70', 71' projecting in a cantilever fashion from the base 45 along respective axes H', I' and angularly integral with driven pulleys 54'a, 54'b, respectively.

The coupling pulleys 59'a, 59'b are fitted on and angularly integral with pins 71', 70', respectively.

The return pulleys 60'a, 60'b are mounted in an idle manner on pins 70', 71', respectively.

The pulleys 59'a, 65'a and belt 60'a are axially spaced from the respective pulleys 65'b, 59'b and to belt 60'b.

Preferably, the coupling pulley 59'a, 59'b is coaxial with the respective driven pulley 54'a, 54'b, and is therefore rotatable about the associated axis F of the respective driven pulley 54'a, 54'b.

Preferably, each support belt 60'a, 60'b comprises a respective toothing 61' meshing with a toothing (not shown) of the respective coupling pulley 59'a, 59'b and the respective return pulley 65'a, 65'b.

In the case shown, the support belts 60'a, 60'b have respective profiles lying on a plane orthogonal to axes A.

Furthermore, the support belts 60'a, 60'b of the same mass unit 8, 9 are parallel to each other and have respective advancement paths Q' parallel to and completely superimposed on each other in a section orthogonal to axis A.

Each support assembly 41' and 42' also comprises a plurality of tensioning rollers 62', ten in the case shown, adapted to control the tension of the support belt 60'a, 60'b and to define the respective advancement path Q'.

Preferably, the tensioning rollers 62' are spaced angularly equidistant around axis A.

Preferably, each support assembly 41' and the respective support assembly 42' share the same tensioning rollers 62'.

Furthermore, each tensioning roller 62' is arranged on the respective base support 45, in particular at a peripheral portion of the respective base support 45.

Each support assembly 41' and 42' also comprises (FIG. 6) a respective coupling element 63' connected integrally with the respective support belt 60' and carrying the respective first mass 10, 11. In particular, the respective coupling element 63' is connected to the respective support belt 60'a, 60'b, so that advancement of the respective support belt 60'a, 60'b along the path Q' causes rotation of the respective mass 10, 11 about axis A.

Preferably, each coupling element 63' is connected to the respective support belt 60'a, 60'b and is adapted to enable the radial sliding of the respective mass 10, 11, so as to enable contact between the wheels 46 and the inner surface of the shell 12.

Each coupling element 63' also comprises a plate 64' connected to the respective support belt 60'a, 60'b at two fastening points and is radially deformable due to the centrifugal forces, so as to enable a radial movement of the respective mass 10, 11.

The functioning of the rotor comprising the actuating device 7' is similar to the operation of rotor 3 with actuating device 7 and is only described with regard to what differentiates it from the latter.

In particular, the operation of actuating device 7' of rotor 3' differs from the operation of actuating device 7 of rotor 3 for the way of controlling the angle between the masses 10, 11 by means of the respective control units 40'.

In greater detail, rotation of the driven pulleys 54'a and 54'b by given angles about the associated axes F causes rotation by given angles of the respective coupling pulleys 59'a, 59'b about the same respective axes I', H'.

Rotation of the coupling pulleys 59'a, 59'b also causes advancement of the support belt 60'a, 60'b for a given arc along the path Q'.

This advancement, in turn, causes rotation of the coupling elements 63' and consequently of the plates 64' and the associated masses 10, 11.

In this way, the angle between the masses 10, 11 of each mass unit 8, 9 is adjusted.

Figure 8:
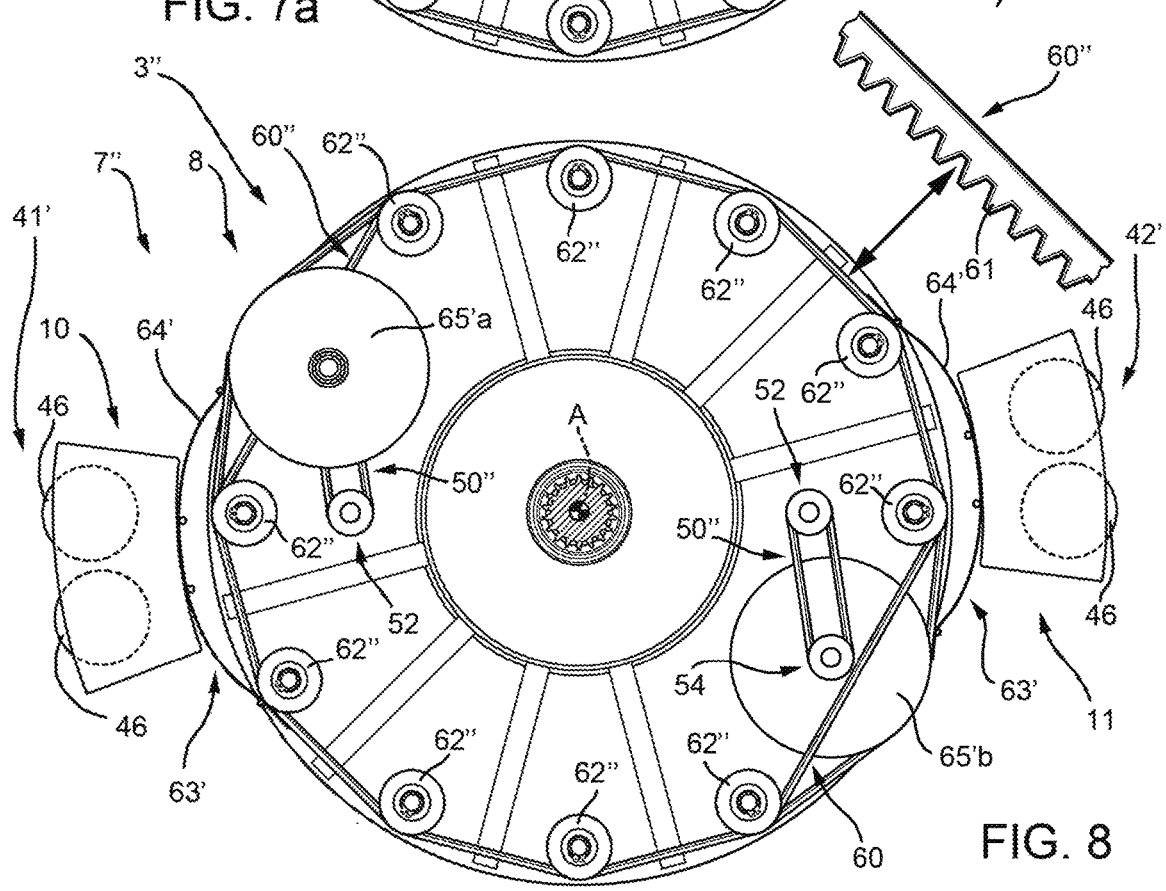
FIG. 8 shows, in plan, some details of an attenuating device incorporated in a rotor according to a third embodiment of the invention, with parts removed for the sake of clarity.

With particular reference to FIG. 8, reference numeral 3" indicates a rotor with an attenuating device 7" (only partially shown) according to a third embodiment of the present invention.

Attenuating device 7" is similar to attenuating device 7' and will hereinafter be described with regard to what differentiates it from the latter; the same or equivalent parts of attenuating devices 7" and 7' will be indicated, where possible, by the same reference numbers.

In particular, attenuating device 7" differs from attenuating device 7' in that the respective support belts 60" of the mass units 8 and 9 are not completely but only partially superimposed on each other and have respective sections staggered from one another parallel to axis A.

In particular, the respective support assemblies 41' and 42' do not share all the same tensioning rollers 62".

The operation of rotor 3" comprising actuating device 7" is similar to the operation of rotor 3' with actuating device 7' and is therefore not described in detail.

From an examination of the characteristics of the rotor 3, 3', 3" according to the present invention, the advantages that can be achieved therewith are evident.

In particular, each control unit 40, 40' comprises a belt 50, 50' connected to the support assembly 41, 41' and a drive unit 51, 51'; 51'a, 51'b connected to the associated belt 50, 50'. The operation of each drive unit 51, 51'; 51'a, 51'b causes movement of the associated belt 50, 50' and the consequent rotation of the masses 10, 11 about axis A.

In consequence, the control units 40, 40' are able to control the angle between the respective masses 10 and 11 of the respective mass units 8, 9 in a particularly flexible and responsive manner.

This occurs since each belt 50 enables rotating the masses 10, 11 in both directions of rotation about axis A.

In this way, unlike the known solutions described in the introductory part of this description, it is possible to rotate masses 10, 11 in the direction that enables reaching the desired angle between the masses 10, 11 of each mass unit 8, 9 more quickly, significantly improving the responsiveness characteristics of the attenuating device 7, 7', 7". This is particularly advantageous in the case of sudden changes in the directions of flexural vibrations generated by the mast 150.

The presence of a belt transmission between each unit 51, 51'a and 51'b and the associated mass 10, 11 enables raising the precision in adjusting the angle between the masses 10, 11.

A further advantage lies in the fact that the attenuating devices 7, 7', 7" have limited axial extensions, due to the fact that:

the masses 10, 11 of the mass units 8, 9 are axially interposed between the actuators 53 of the mass units 8, 9; and the first epicyclic train comprises portions in common with the second epicyclic train.

Lastly, due to the fact that the belts 50, 50' and the drive pulleys 52 are coupled in a reversible manner, the masses 10, 11 of the mass units 8, 9 do not remain blocked in the event of failure of the associated actuator 53.

It is thus possible to return these masses 10, 11 of the mass units 8, 9 to a desired position by means of respective springs (not shown).

Finally, it is clear that modifications and variants can be made regarding the rotor 3, 3', 3" described and illustrated herein without departing from the scope defined by the claims.

In particular, the control units 40 could cause the additional rotation of just the support assemblies 41, 41' (42, 42') and just masses 10 (11) about axis A with respect to the associated auxiliary shafts 16, 17. In this condition, the support assemblies 42, 42' (41, 41') and masses 11 (10) would rotate integrally with the associated auxiliary shafts 16 and 17.

Each mass 10 and 11 could comprise a single wheel 46.

The rotor 3, 3', 3" could be used in a convertiplane instead of in a helicopter 1.

Finally, the rotor according to the present invention could be the tail rotor of the helicopter 1 instead of the main rotor 3, 3', 3".

The invention claimed is:

1. A rotor (3, 3', 3") for a hover-capable aircraft (1), comprising:
   a hub (4) rotatable about a first axis (A) and comprising a plurality of blades (5);
   a mast (150) connectable to a drive member of the aircraft (1) and operatively connected to the hub (4) to drive, in use, the hub (4) in rotation about the first axis (A);
   an attenuating device (7, 7', 7") configured to attenuate a transmission of vibrations from the mast (150) in a plane orthogonal to the first axis (A); and
   a transmission device (15) configured to transfer, in use, a rotation of the mast (150) about the first axis (A) to the attenuating device (7, 7', 7");
   wherein the attenuating device (7; 7') comprises at least a first mass unit (8, 9) and a second mass unit (9, 8); each first mass unit (8, 9) and second mass unit (9, 8) comprising at least a first mass (10, 11) and a second mass (11, 10);
   the first and second masses (10, 11; 11, 10) of the first and second mass units (8, 9; 9, 8) being rotatable about the first axis (A) and being operatively connected to the mast (150) so as to respectively generate a first centrifugal force and a second centrifugal force on the mast (150) having respective main components in a direction radial to said first axis (A);
   wherein the transmission device (15) is configured to drive, in use, the first mass unit (8; 9) and the second mass unit (9; 8) in rotation about the first axis (A) with, respectively, a first rotational speed $((N-1)*\Omega; (N+1)*\Omega))$ and a second rotational speed $((N+1)*\Omega; (N-1)*\Omega)$ with respect to the mast (150) and in opposite directions to each other;
   wherein the attenuating device (7, 7', 7") further comprises two control units (40, 40'), one operatively connected to the first mass unit (8; 9) and the other to the second mass unit (9; 8), and each selectively operable to cause an additional rotation of at least one of the first and second masses (10; 11) of the associated first and second mass units (8, 9; 9, 8) with respect to the transmission device (15) and selectively control the relative angle between the first mass (10; 11) and the second mass (11; 10) of the associated first and second mass units (8, 9; 9, 8);
   wherein each first mass unit (8) and second mass unit (9; 8) comprises a respective first support assembly (41, 41'; 42, 42') carrying the respective first mass (10; 11) and a respective second support assembly (42, 42'; 41, 41') carrying the respective second mass (11; 10);
   wherein each control unit (40, 40') is operatively coupled to at least the respective first support assembly (41, 42; 41', 42') to cause it to rotate about said first axis (A) with respect to the transmission device (15) and control the relative angle between the first mass (10; 11) and the second mass (11; 10) of the corresponding first and second mass units (8, 9; 9, 8);
   characterized in that each control unit (40, 40') comprises:
   a belt (50; 50') operatively coupled to the first support assembly (41, 41'; 42, 42') and movable along a given path (P); and
   a drive unit (51, 51') operatively coupled to the first belt (50; 50') and configured to cause a movement of the first belt (50; 50') along at least a portion of the given path (P) and cause the additional rotation of the first support assembly (41, 41'; 42, 42') with respect to said transmission device (15) about said first axis (A).

2. The rotor according to claim 1, wherein each first and second mass (10, 11; 11, 10) is coupled to the respective first support assembly (41, 42; 41', 42') in a radially movable manner so as to be, in use, pushed against an internal wall of the attenuating device (7, 7', 7").

3. The rotor according to claim 1, wherein each drive unit (51, 51'a, 51'b) comprises:
   a drive pulley (52) rotatable about a respective second rotation axis (F);
   an actuator (53), which is operatively connected to the drive pulley (52) and is operable to cause the rotation of the first drive pulley (52) about the respective second rotation axis (F); and
   a driven pulley (54; 54'a, 54'b) rotatable about a respective third rotation axis (G; H', I') and operatively connected to the respective first support assembly (41, 41');
   wherein the respective first belt (50: 50') is wound around the respective drive pulley (52) and around the respective driven pulley (54; 54'a, 54'b), so as to be slidable along at least a portion of the respective given path (P) following rotation of the respective drive pulley (52) about the respective second axis (F) and to cause, in use, the rotation of the driven pulley (54; 54'a, 54'b) about the respective third axis (G; H', I') so as to obtain the rotation of the first support assembly (41, 41').

4. The rotor according to claim 3, wherein the first and second masses (10) of the first and second mass units (8, 9) are axially interposed between the associated actuators (53) and/or are arranged radially external with respect to the associated actuators (53).

5. The rotor according to claim 3, wherein each actuator (53) comprises an output shaft (55) operatively connected to the respective drive pulley (52) and rotatable about a respective second axis (F).

6. The rotor according to claim 3, wherein each of the first mass unit (8, 9) and the second mass unit (9, 8) comprises a respective base support (45) rotatable about the first axis (A) and operatively connected to the transmission device (15) to be, in use, driven in rotation about the first axis (A) with the first and second rotational speeds $((N-1)*\Omega; (N+1)*\Omega); ((N-1)*\Omega; (N+1)*\Omega)$, respectively;
   wherein the respective first support assembly (41, 41') is connected in a rotatable manner to the respective base support (45) on a first side of the respective base support (45) and the respective actuator (53) is integrally connected to the respective base support (45) at a second side of the respective base support (45) axially opposite to the first side with reference to said first axis (A).

7. The rotor according to claim 3, wherein each first support assembly (41) comprises a respective arm (43) carrying the respective first mass (10);
wherein the respective arm (43) is coupled in an angularly integral manner with the respective driven pulley (54).

8. The rotor according to claim 7, wherein the first mass (10) comprises at least:
at least one wheel (46); and
a coupling element (47) carrying the respective wheel (46) and coupled to the respective arm (43);
wherein the first wheel (46) is coupled in a radially movable manner to the respective coupling element (47) and/or the respective coupling element (47) is coupled in a radially movable manner to the respective arm (43).

9. The rotor according to claim 3, wherein the third axis (G) is coincident with the first axis (A).

10. The rotor according to claim 3, wherein each first support assembly (41', 42') comprises a respective support belt (60'a, 60'b) carrying the respective first mass (10, 11), movable along a further closed advancement path (Q'), and operatively coupled to the respective driven pulley (54'a, 54'b) so as to be movable along the respective further advancement path (Q') following the rotation of the respective driven pulley (54'a, 54'b).

11. The rotor according to claim 10, wherein each drive unit (51') comprises:
a respective coupling pulley (59'a, 59'b) integrally rotatable with the respective driven pulley (54'a, 54'b), operatively connected to the respective first or second support assembly (41', 42'), and around which the associated support belt (60'a, 60'b) is wound; and
a respective return pulley (64'a, 64'b) around which the associated support belt (60'a, 60'b) is wound;
the coupling pulley (59'a, 59'b) of each drive unit (51') being coaxial with the return pulley (64'b, 64'a) of the other drive unit (51).

12. The rotor according to claim 10 or 11, wherein each first support assembly (41'; 42') comprises a coupling element (63') integrally connected with the respective support belt (60'a, 60'b) and carrying the respective first mass (10, 11).

13. The rotor according to claim 12, wherein the coupling element (63') comprises a plate (64') connected to the respective support belt (60') and deformable in a direction radial to the first axis (A).

14. The rotor according to claim 1, wherein both the first support assembly (41, 41'; 42, 42') and the second support assembly (42, 42'; 41, 41') of the first and second mass units (8, 9; 9, 8) are rotatable about the first axis (A) with respect to the transmission device (15);
each control unit (40) also being operatively coupled to the respective second support assembly (42, 41; 42', 41'), to cause its rotation about said first axis (A).

15. The rotor according to claim 1, wherein the transmission unit (15) comprises at least:
a first auxiliary shaft (16) angularly integral with the first mass unit (8) and rotatable about the first axis (A);
a second auxiliary shaft (17) angularly integral with the second mass unit (9) and rotatable about the first axis (A); and
a transformation unit (18) functionally coupled to the mast (150) and to the first and second auxiliary shafts (16, 17) and configured to receive motion from the mast (150) and transfer the motion to the first and second auxiliary shafts (16, 17) so that the first auxiliary shaft (16) and the second auxiliary shaft (17), in use, rotate about the first axis (A) with the first rotational speed ((N−1)*Ω) in the same direction of rotation as the mast and with the second rotational speed ((N+1*Ω)) in the opposite direction to the direction of rotation to the mast (150), respectively;
wherein the first rotational speed is equal to ((N−1)*Ω) and the second rotational speed is equal to ((N+1)*Ω), where N is the number of blades (5) and Ω is the rotational speed of the mast, in a reference system integral with the fuselage (2);
wherein the first mass unit (8) is rotatable in the same direction as the mast; and
wherein the second mass unit (9) is rotatable in the opposite direction to the mast (150);
and/or in which the transmission device (15) comprises:
a first epicyclic train functionally interposed between the mast (150) and the first auxiliary shaft (16); and
a second epicyclic train functionally interposed between the mast (150) and the second auxiliary shaft (17);
the first epicyclic train comprising a portion in common with the second epicyclic train.

\* \* \* \* \*